(12) United States Patent
Jacob

(10) Patent No.: US 10,100,714 B2
(45) Date of Patent: Oct. 16, 2018

(54) CYLINDER HEAD

(71) Applicant: GE Jenbacher GmbH & Co OG, Jenbach (AT)

(72) Inventor: Raphael Jacob, Pfaffenhofen (DE)

(73) Assignee: GE JENBACHER GMBH & CO OG, Jenbach (AT)

(*) Notice: Subject to any disclaimer, the term of this patent is extended or adjusted under 35 U.S.C. 154(b) by 65 days.

(21) Appl. No.: 15/050,914

(22) Filed: Feb. 23, 2016

(65) Prior Publication Data

US 2016/0252006 A1    Sep. 1, 2016

(30) Foreign Application Priority Data

Feb. 27, 2015  (AT) .............................. A 50161/2015

(51) Int. Cl.
*F02B 19/10*  (2006.01)
*F02M 21/02*  (2006.01)
(Continued)

(52) U.S. Cl.
CPC .......... *F02B 19/1033* (2013.01); *A01C 7/107* (2013.01); *A01C 17/006* (2013.01); *F02B 19/108* (2013.01); *F02B 19/12* (2013.01); *F02F 1/42* (2013.01); *F02M 21/0242* (2013.01); *F02M 21/0269* (2013.01); *F02M 21/0275* (2013.01); *F02M 21/0281* (2013.01);
(Continued)

(58) Field of Classification Search
CPC .... F02B 19/1033; F02B 19/108; F02B 19/12; A01C 7/107; A01C 17/006; A01C 17/001; F02F 1/42; F02M 21/0242; F02M 21/0269; F02M 21/0275; F02M 21/0281; Y02T 10/125; Y02T 10/32

USPC ........................................................ 123/266
See application file for complete search history.

(56) References Cited

U.S. PATENT DOCUMENTS 2,667,155 A    1/1954   Paluch et al.
3,406,667 A   10/1968   Evans et al.
(Continued)

FOREIGN PATENT DOCUMENTS

CN    101215987 A    7/2008
DE    100 20 719     2/2001
(Continued)

OTHER PUBLICATIONS

Austrian Search Report dated Aug. 17, 2015 in corresponding Austrian Patent Application No. 50161/2015 (with English translation).

(Continued)

*Primary Examiner* — Joseph Dallo
*Assistant Examiner* — Yi-Kai Wang
(74) *Attorney, Agent, or Firm* — GE Global Patent Operation

(57) ABSTRACT

A cylinder head comprising a cavity for receiving a pre-chamber gas valve, wherein an opening extending substantially or completely around the pre-chamber gas valve forms an annular passage with a wall of the cavity, that surrounds the pre-chamber gas valve, wherein the annular passage is connected to at least one gas feed passage for supplying the pre-chamber gas valve with combustion gas, wherein the annular passage with at least one inclined gas passage is connected with the lower cavity of the pre-chamber gas valve.

9 Claims, 8 Drawing Sheets

(51) Int. Cl.
*F02B 19/12* (2006.01)
*F02F 1/42* (2006.01)
*A01C 7/10* (2006.01)
*A01C 17/00* (2006.01)

(52) U.S. Cl.
CPC .......... *A01C 17/001* (2013.01); *Y02T 10/125* (2013.01); *Y02T 10/32* (2013.01)

(56) References Cited

U.S. PATENT DOCUMENTS

| | | | |
|---|---|---|---|
| 4,903,656 A * | 2/1990 | Nakazono | ........... F02B 19/1014 123/253 |
| 5,024,193 A | 6/1991 | Graze, Jr. | |
| 5,222,993 A | 6/1993 | Crane | |
| 6,354,263 B2 | 3/2002 | Ibrahim | |
| 8,757,127 B2 | 6/2014 | Ishida et al. | |
| 9,371,771 B2 | 6/2016 | Lee et al. | |
| 9,482,362 B2 | 11/2016 | Lee et al. | |
| 2002/0002962 A1 | 1/2002 | Ibrahim | |
| 2014/0165958 A1 | 6/2014 | Lee et al. | |
| 2015/0001430 A1* | 1/2015 | Lee | ........................ F02M 61/20 251/322 |
| 2015/0014565 A1 | 1/2015 | Lee et al. | |
| 2016/0010538 A1* | 1/2016 | Suzuki | ................ F02B 19/1085 123/292 |
| 2016/0195003 A1* | 7/2016 | Konczol | ................. F02B 19/12 123/253 |
| 2016/0195051 A1* | 7/2016 | Konczol | ............. F02B 19/1014 123/297 |
| 2016/0245151 A1* | 8/2016 | Yuuki | ..................... F02B 19/08 |

FOREIGN PATENT DOCUMENTS

| | | |
|---|---|---|
| DE | 10 2004 016 260 | 10/2005 |
| EP | 0 480 545 | 4/1992 |
| EP | 2 816 216 | 12/2014 |
| JP | 60104752 A | 6/1985 |
| JP | 01313662 A | 12/1989 |
| JP | 4-171256 | 6/1992 |
| JP | 5-504185 | 7/1993 |
| JP | 2007-255313 | 10/2007 |
| JP | 2014181613 A | 9/2014 |
| KR | 10-2011-0053049 | 5/2011 |
| KR | 10-2011-0053050 | 5/2011 |
| KR | 10-2013-0010679 | 1/2013 |

OTHER PUBLICATIONS

European Search Report dated Aug. 5, 2016 in corresponding European Application No. 16 15 6827, with English translation.
JP Office Action dated Mar. 7, 2017 issued in corresponding JP Application No. 2016031916.
Machine translation and First Office Action and Search issued in connection with corresponding CN Application No. 201610305111.2 dated Jan. 23, 2018.

* cited by examiner

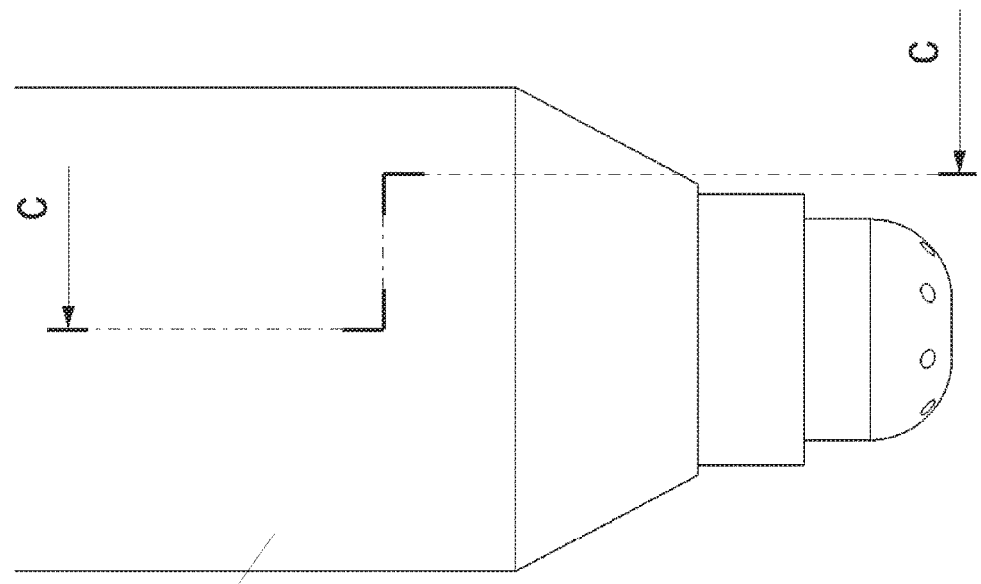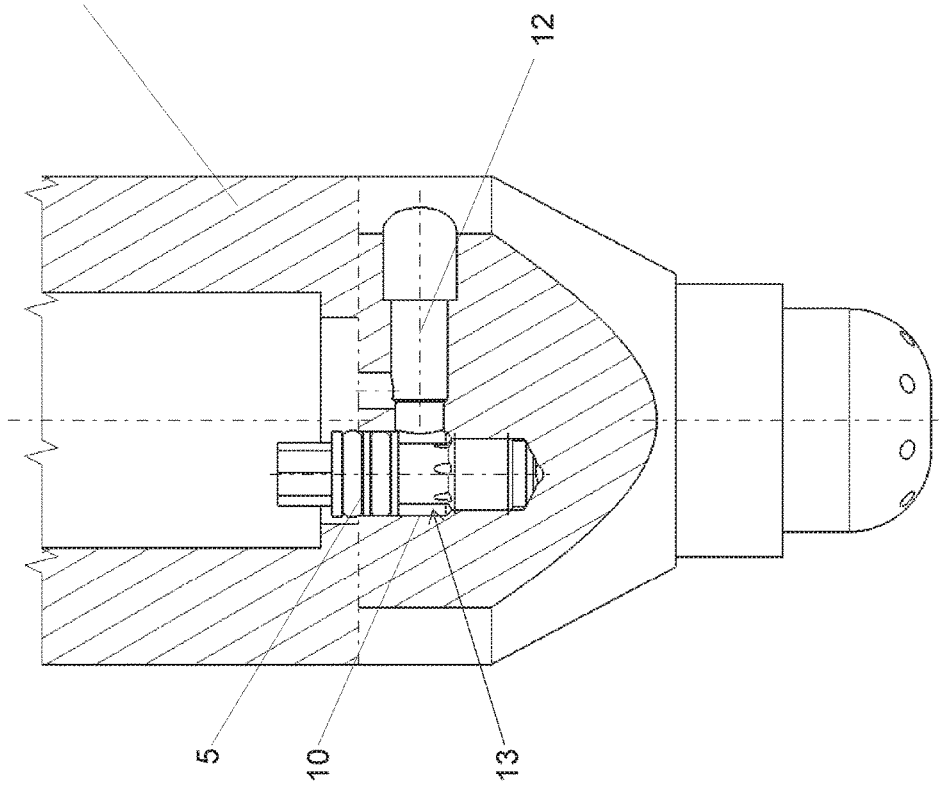

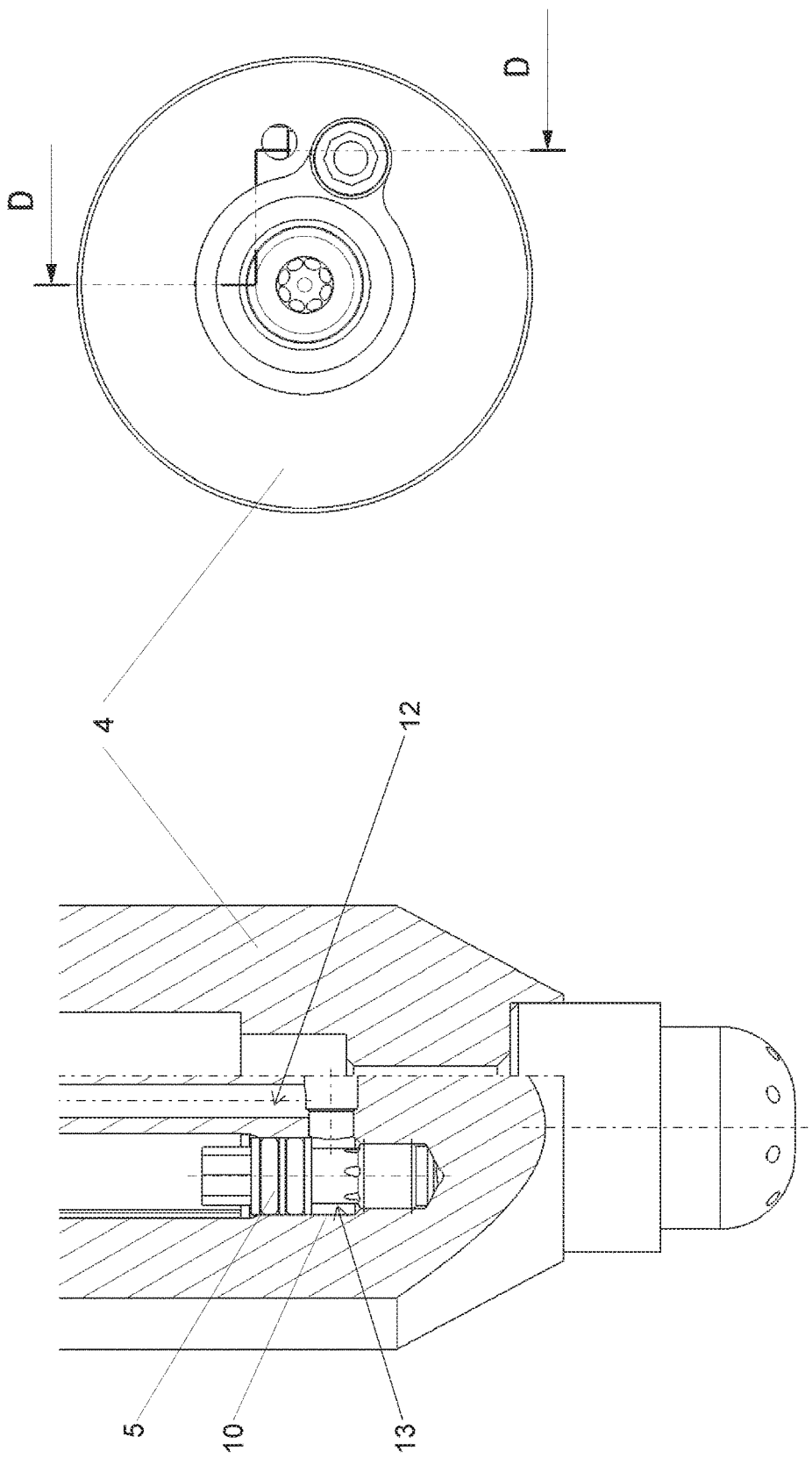

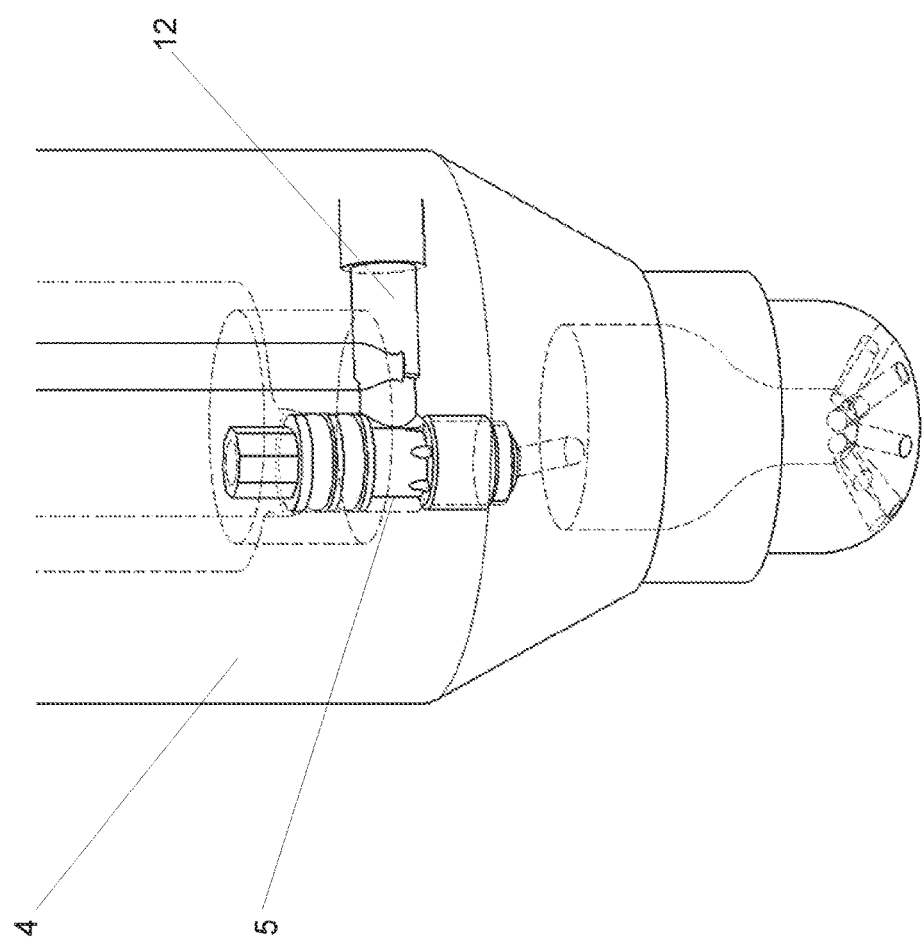

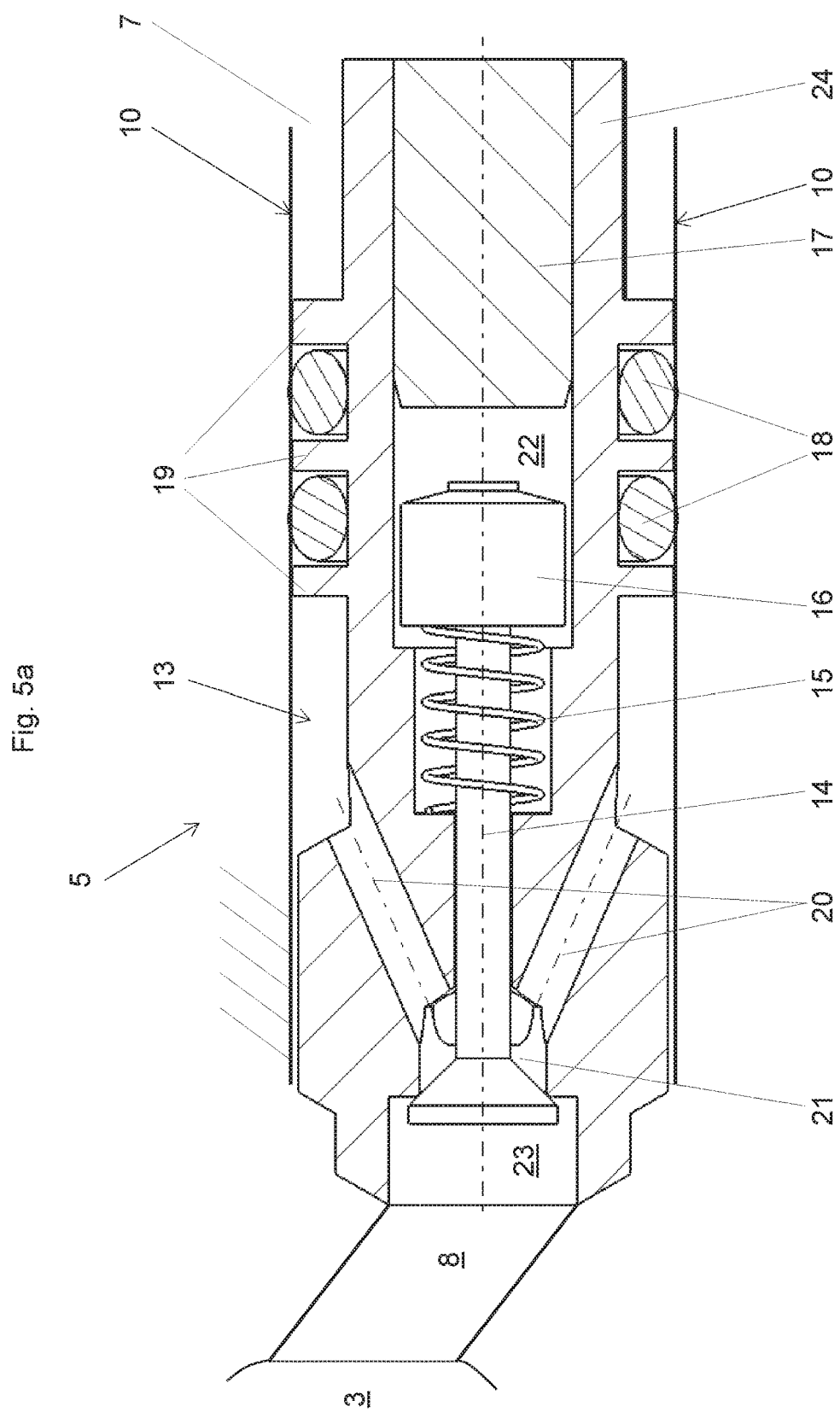

CYLINDER HEAD

The invention concerns a cylinder head having the features of the classifying portion of claim 1.

As from a given bore (about 150 mm) internal (gas) combustion engines are fitted with a pre-chamber for ignition boosting. An ignition source which projects into the pre-chamber ignites the mixture which is present there and which is relatively rich in the case of a flushed pre-chamber, whereby ignition flares pass from the pre-chamber into a main combustion chamber and ignite the mixture present there.

There are various design concepts for supplying fuel to pre-chambers. In the case of non-flushed pre-chambers mixture is urged out of the main combustion chamber into the pre-chamber in the compression stroke.

In the case of flushed pre-chambers there is also the possibility of additionally supplying the pre-chamber with fuel. That separate fuel supply is effected by way of a pre-chamber gas valve. That valve can be arranged in the cylinder head directly or in a spark plug sleeve.

A cylinder head of the general kind set forth is known from the state of the art. Thus DE 10 2004 016 260 (CATERPILLAR MOTOREN GMBH) discloses a gas engine with pre-chamber into which gas flows by way of a passage (3). The illustrated gas engine cylinder head (1) has a flushed pre-chamber (2) and a separate gas feed passage (3) for supplying a combustion chamber (4) with gas for the ignition energy, wherein the usual ignition process is performed by way of a spark plug (8). A solenoid valve (5) is arranged in the gas feed passage (3) in a receiving region (6) and the outlet opens directly into the combustion chamber (4).

EP 0480545 (YANMAR DIESEL ENGINE CO) discloses a pre-chamber gas valve supplied with fuel gas by way of a passage (18). The gas passes by way of mutually opposite bores into a hollow space (138) from which the gas passes over into the pre-chamber when the valve is opened. A disadvantage with the arrangement shown there is the increased amount of space required as well as the complication and expenditure involved in component alignment (positionally correct angular orientation for ensuring the through-flow of gas).

JP H04171256 A shows a valve with a body, a valve spring, a valve needle, and a lower cavity which is supplied with gas. There is also an upper cavity in which the valve spring is arranged. The gas is supplied to the valve from the side. A bore directed radially leads to a very narrow annular passage. Bores directed radially lead from there to the valve needle.

In U.S. Pat. No. 2,667,155 A a pre-chamber gas valve is disclosed which comprises a two-piece valve body, a valve spring and a valve needle. The lower cavity is supplied with gas and the valve spring is located in the upper cavity. Here again the gas reaches the valve housing via radial bores and through a narrow annular passage.

The object of the present invention is to provide a cylinder head which is improved over the state of the art.

That object is attained by a cylinder head as set forth in claim 1. Advantageous configurations are recited in the depending claims.

A cylinder head according to the invention comprises a cavity for receiving a pre-chamber gas valve, wherein a recess extending substantially or completely around the pre-chamber gas valve forms an annular passage with a wall of the cavity, that surrounds the pre-chamber gas valve, wherein the annular passage is connected to at least one gas feed passage for supplying the pre-chamber gas valve with combustion gas, wherein the annular passage is connected by at least one inclined gas passage with the lower cavity of the pre-chamber gas valve.

Advantages of the invention are in particular:
flow of combustion gas into the pre-chamber gas valve by way of the annular passage in a favorable fashion in regard to flow characteristics,
solid construction of the valve body by compact arrangement without additional gas passages,
symmetry in the lower cavity of the valve possible even with a lateral intake flow by way of the gas feed passage (with more than one passage), and
no defined angular position with respect to the longitudinal axis of the pre-chamber gas valve is required upon installation, It can preferably be provided that the angle of the gas passage with respect to the symmetry of the valve body is of between 20° and 70°. By such a position of this gas passage, due to a solid construction, particularly a high stability of the pre-chamber gas valve can be achieved. Moreover, fluidic conditions of the supplied gas can be optimized by the fact that there are no acute angles. For the production of such a gas passage it can be provided that one side of the annular passage is inclined (towards the valve body). For example, the inclined side of the annular passage can be perpendicular to the axis of the gas passage. Thereby, the drilling of the bores is facilitated in production. In a particularly preferred embodiment it can be provided that the angle of the gas passage with respect to the symmetry axis of the valve body is of between 20° and 30°.

It can preferably be provided that the annular passage is connected to a lower cavity of the pre-chamber gas valve by two to six gas passages. Thereby, an optimal filling of the lower cavity of the pre-chamber gas valve can be realized—with respect to both fluidic as well as temporal qualities. Moreover, an essentially symmetrical flow is thereby achieved inside the valve body.

It can preferably be provided that a spark plug sleeve is fitted into the cylinder head so that the wall of the cavity, that with the pre-chamber gas valve forms an annular passage, is formed by the wall of the spark plug sleeve. That describes the situation where the pre-chamber gas valve is not fitted directly into the cylinder head but is arranged in a spark plug sleeve.

It can also be provided that the wall of the cavity, that with the pre-chamber gas valve forms an annular passage, is formed by a wall of the cylinder head itself. In that case the pre-chamber gas valve is fitted into the cylinder head directly, that is to say without being by means of a spark plug sleeve.

It can be provided that in the pre-chamber gas valve is at least one gas passage communicating the annular passage with a lower cavity of the pre-chamber gas valve. Therefore at least one gas passage is provided in the valve body of the pre-chamber gas valve. In operation of the pre-chamber gas valve combustion gas is passed through that gas passage from the annular passage in the direction of the valve seat of the pre-chamber gas valve. The valve body of the pre-chamber gas valve therefore performs the task, in the form of the gas passage, of guiding the combustion gas from the annular passage to the location of discharge at the valve seat. That structure has proven to be particularly advantageous.

It can be provided that between the seat of the valve head of the pre-chamber gas valve and the mouth opening of the pre-chamber gas valve into the pre-chamber or between the seat of the valve head of the pre-chamber gas valve and the mouth opening of the pre-chamber gas valve into the passage there is a space. That describes the situation where the valve head of the pre-chamber gas valve does not directly adjoin the pre-chamber or the passage leading to the pre-chamber, but a hollow space is formed therebetween. The provision of that space provides for a particularly favorable flow of the gas from the pre-chamber gas valve into the pre-chamber (when the pre-chamber gas valve is arranged flush with the pre-chamber) or into the passage (with a spaced arrangement of the pre-chamber gas valve).

It can preferably be provided that the space is of a substantially pear-shaped configuration which narrows towards the pre-chamber. In that way the flow of gas from the pre-chamber gas valve into the pre-chamber or into the passage can be advantageously influenced and nonetheless the volume can be kept small.

It can be provided that at its outside contour the pre-chamber gas valve has at least one projection whose flank that is towards the annular passage also delimits the annular passage and against the other flank of which bears a sealing means for sealing off the pre-chamber gas valve with respect to the bore. That provides for component integration in a particularly simple fashion. The radial passage can be of a radial depth corresponding to the height of the projection, deeper or however also less deep. If the height of the projection is considered that allows a less disturbed geometry in respect of the main valve body. For example an O-ring can be used as a sealing means, which seals off the pre-chamber gas valve radially with respect to the bore. Naturally it is also possible to provide further projections which can receive further sealant.

It can be provided that a spark plug is arranged in the cylinder head, wherein the spark plug and the pre-chamber gas valve are arranged in a common cavity of the cylinder head. That is particularly advantageous in regard to a compact structure. Preferably in that case the spark plug and the pre-chamber gas valve are arranged in bores which mutually pass through each other. In that way the spark plug and the pre-chamber gas valve can involve a still more space-saving installation.

The invention is illustrated in greater detail by the Figures in which:

FIGS. 4a through 4e show details relating to the gas feed concept, and

FIGS. 5a and 5b show a pre-chamber gas valve and a variant thereof.

Figure 1A:
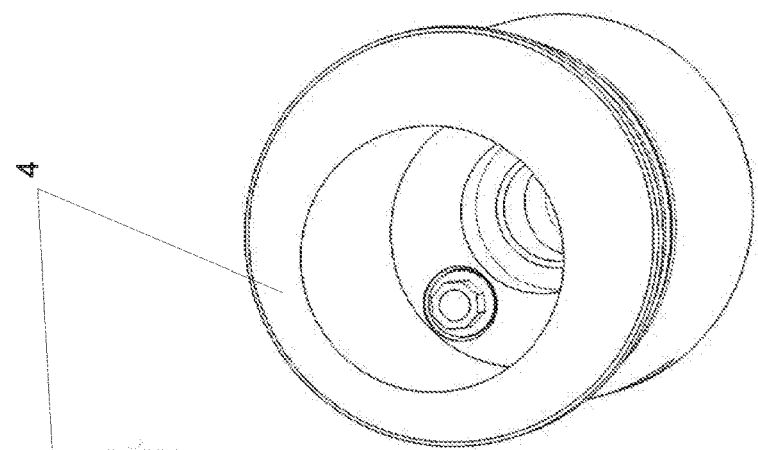
FIGS. 1a through 1c is through is show a cylinder head with spark plug sleeve.

FIG. 1a is shows a cylinder head 2 with a spark plug sleeve 4 fitted into the cylinder head 2. In this embodiment a cavity 7 is formed by the spark plug sleeve 4.

Figure 1B:
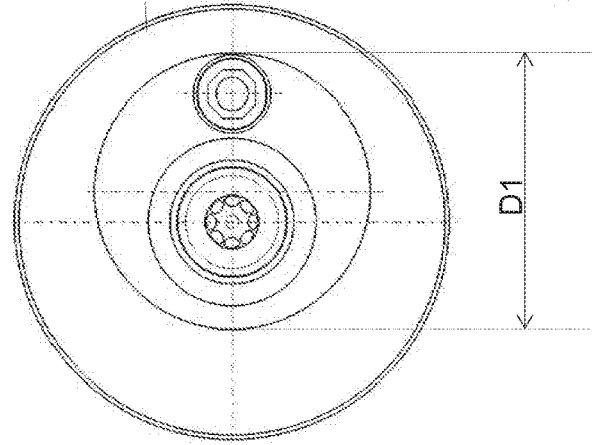
Figure 1C:
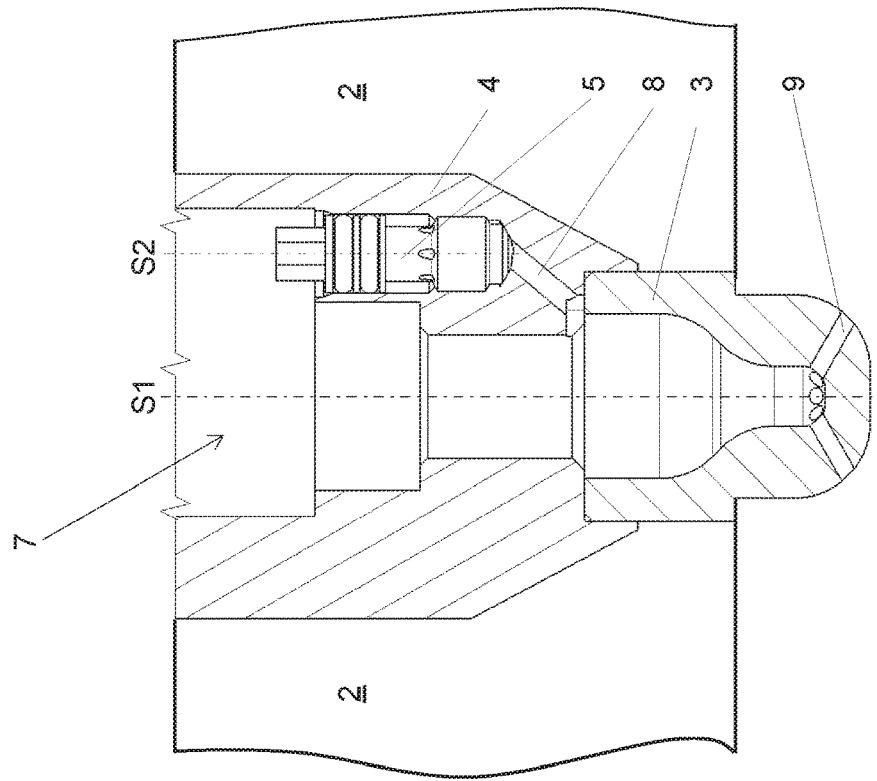

FIGS. 1b and 1c show two views of the spark plug sleeve 4.

FIG. 1a shows a longitudinal section through the cavity 7 which accommodates a spark plug 6 (not shown) and a pre-chamber gas valve 5.

The cavity 7 includes on the one hand a shaft which is concentric around the axis of symmetry S1, consisting of cylinder portions, for receiving a spark plug 6.

The cavity 7 further has a bore 10 with an axis of symmetry S2 for receiving a pre-chamber gas valve 5.

A passage 8 leads from the pre-chamber gas valve 5 to the pre-chamber 3. The pre-chamber 3 comprises on the one hand the actual cavity, that is to say the hollow space in which the ignition of mixture takes place. The pre-chamber 3 is of course also a physical component. In the present embodiment the pre-chamber 3 is in the form of a component separate from the spark plug sleeve 4 and is connected to the spark plug sleeve 4, for example by pressing.

The spark plug 6 which is not shown for the sake of clarity is introduced into the spark plug sleeve 4 by way of the shaft concentric with the axis of symmetry S1, in such a way that it terminates flush with the pre-chamber 3 and its electrodes project into the pre-chamber 3. The pre-chamber 3 is enriched with combustion gas by the pre-chamber gas valve 5 by way of the passage 8. After ignition in the pre-chamber 3 ignited mixture passes by way of the flow transfer bores 9 into the main combustion chamber (not shown).

FIG. 1b shows a plan view of FIG. 1a. It is possible to see the parallel cylindrical shafts disposed within the cavity 7 for receiving a spark plug 6 and a pre-chamber gas valve 5. The spark plug 6 is not shown, as explained with reference to FIG. 1a. It is possible to see in the pre-chamber gas valve 5 an octagon with which the pre-chamber gas valve 5 is screwed into the spark plug sleeve 4. In the present embodiment there is a largest bore diameter D1 of the cavity 7, which in a plan view circumscribes the bores for receiving the spark plug 6 and the pre-chamber gas valve 5. In other words, in this embodiment, there is a common shaft for spark plug 6 and pre-chamber gas valve 5.

The center line of that largest bore of the diameter D1 is between the axes of symmetry S1 and S2. The common shaft has advantages in terms of mounting of the spark plug 6 and the pre-chamber gas valve 5, but weakens the spark plug sleeve 4 as there is only little wall thickness remaining.

FIG. 1c shows a perspective view of the spark plug sleeve 4 of this embodiment.

Figure 2A:
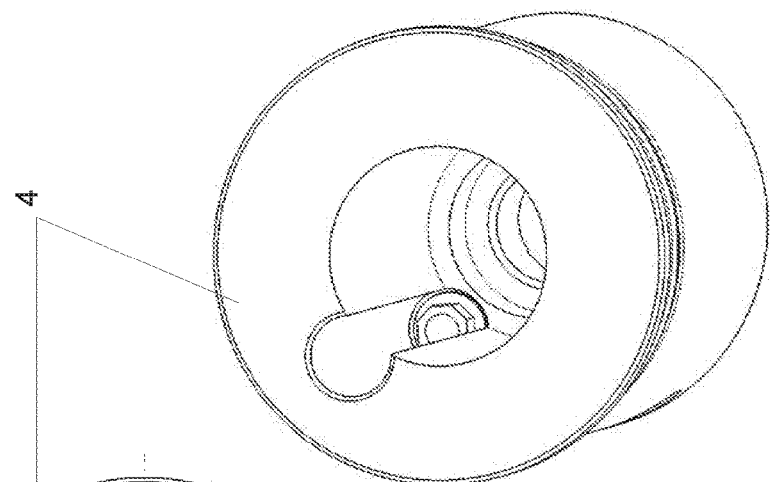
FIGS. 2a through 2c show a spark plug sleeve for a cylinder head.
Figure 2B:
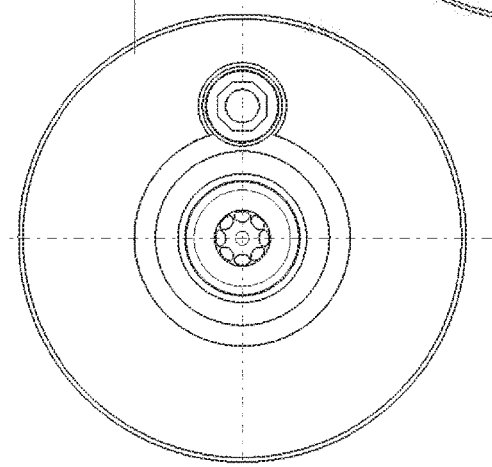
Figure 2C:
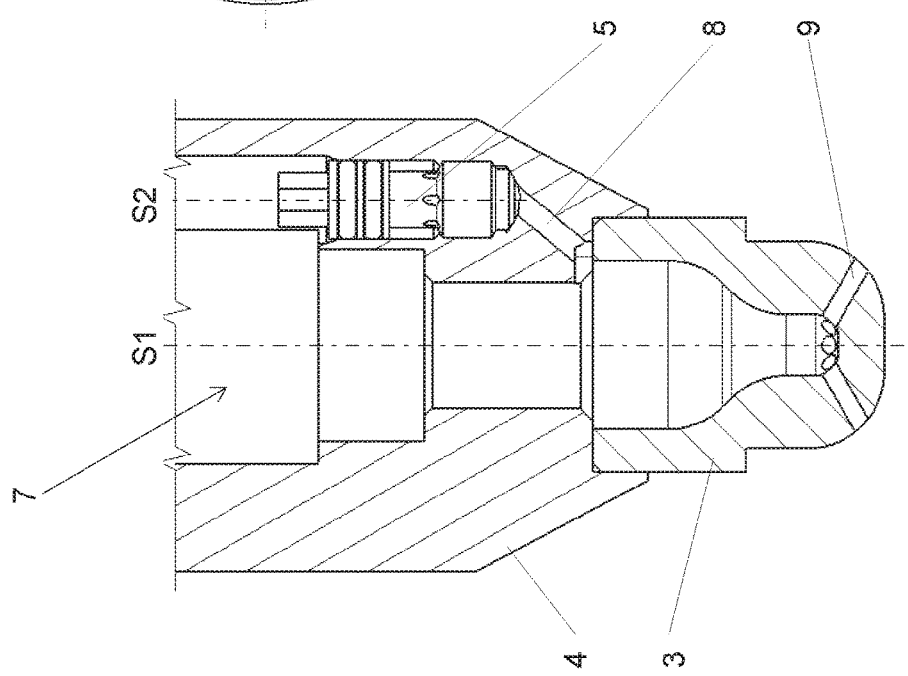

FIGS. 2a through 2c show various views of a spark plug sleeve 4 for insertion into a cylinder head 2 (not shown) in accordance with a further embodiment. Here too the cavity 7 is formed by the spark plug sleeve 4. While in the embodiment of FIGS. 1a through 1c the cavity 7 has a cylindrical portion which with its largest diameter circumscribes both the bore for receiving the spark plug and also the bore for receiving the pre-chamber gas valve 5, in the present embodiment the largest diameter of the cavity 7 no longer entirely embraces the bore of the spark plug sleeve 4. Rather, the bore 10 of the pre-chamber gas valve 5 passes through the spark plug bore 11 in the upper portion thereof, of the largest diameter. That will be particularly clearly apparent from the view in FIGS. 2b and 2c. In a plan view (FIG. 2b) therefore the bore 10 for receiving the pre-chamber gas valve 5 and the bore for receiving the spark plug 6 overlap.

Figure 3C:
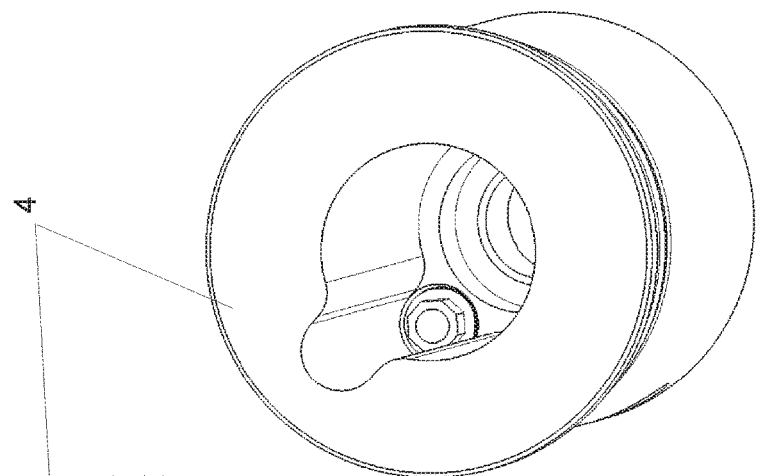
FIGS. 3a through 3c show a further spark plug sleeve for a cylinder head.
Figure 3B:
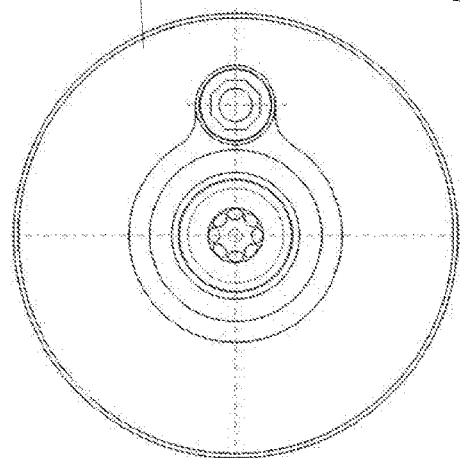
Figure 3A:
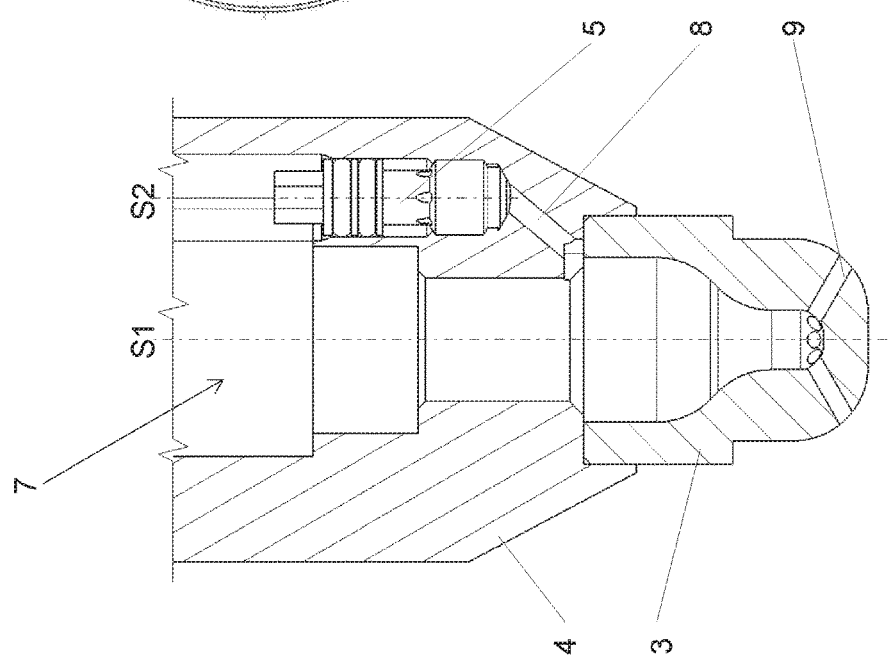

FIGS. 3a through 3c show a further embodiment of a spark plug sleeve 4 for insertion into a cylinder head 2 (not shown). Here too the cavity 7 is formed by the spark plug sleeve 4.

Here the bore for receiving the pre-chamber gas valve 5 is also not circumscribed by a largest diameter of the cavity 7. In other words, here too the bores for receiving a spark plug 6 and for receiving the pre-chamber gas valve 5 pass through each other. In comparison with the embodiment shown in FIGS. 2a through 2c here the contour of the cavity 7 is altered. Here the contour of the cavity 7 is of such a configuration that the cylindrical bores for receiving the spark plug 6 and the pre-chamber gas valve 5 blend smoothly into each other. In other words, the sharp transitions of the embodiment of FIGS. 2a through 2c are here replaced by a smooth radius in the transition of the two bores.

FIG. 4a shows a section through a spark plug sleeve 4, wherein the section was so positioned that the gas feed to the pre-chamber gas valve 5 is clearly illustrated. The section line is sketched in FIG. 4b.

A gas feed passage 12 opens into an annular passage 13 which is formed between a wall 10 surrounding the pre-chamber gas valve 5 and the outside contour of the pre-chamber gas valve 5. In other words the bore 10 together with the pre-chamber gas valve 5 forms an annular passage 13 into which the gas feed passage 12 opens.

From the annular passage 13 formed by the wall 10 and the pre-chamber gas valve 5, the inflowing gas is guided uniformly into the pre-chamber gas valve 5. In the embodiment illustrated here the wall 10 is again formed by the wall of the spark plug sleeve 4.

FIG. 4c shows a longitudinal section through the spark plug sleeve 4. The section line can be seen from FIG. 4d. As can be seen from FIG. 4c the sectioning is here so selected that it is also possible to see the part of the gas feed passage 12, that extends parallel to the axis of symmetry S1.

FIG. 4e is an isometric perspective view showing the arrangement of the pre-chamber gas valve 5 and its gas supply. The gas supply is afforded by the horizontal and the vertical portions of the gas feed passage 12.

FIG. 5a shows a sectional view of a pre-chamber gas valve 5. The pre-chamber gas valve 5 can be fitted into a cavity 7 formed by a cylinder head 2 (not shown here) or into a cavity 7 formed by a spark plug sleeve 4 (not shown here). The cavity 7 is therefore an opening which is provided either in a cylinder head 2 directly or in a spark plug sleeve 4 and which can accommodate a pre-chamber gas valve 5.

It is possible to clearly see the annular passage 13 formed between the wall 10 of the cavity 7 and the outside contour of the pre-chamber gas valve 5. The wall 10 can be formed either by the cylinder head 2 itself or by a spark plug sleeve 4 fitted into the cylinder head 2. That possibility was described by means of the embodiments shown in FIGS. 1 through 4.

The valve needle 14 is braced against its seat by the spring 15. The cap 16 embraces the spring 15 and is connected to the valve needle 14 for example by way of a beam welding.

The plug 17 closes and seals off the pre-chamber gas valve 5 upwardly. Sealing of the annular passage 13 with respect to the cavity 7 is effected radially by way of the O-rings 18. They are arranged in annular receiving means formed by the projections 19. The sealing concept of the pre-chamber gas valve 5 shown here therefore provides that sealing of the pre-chamber gas valve 5 is effected radially, that is to say by way of the outside surface of the pre-chamber gas valve 5.

Figure 5B:
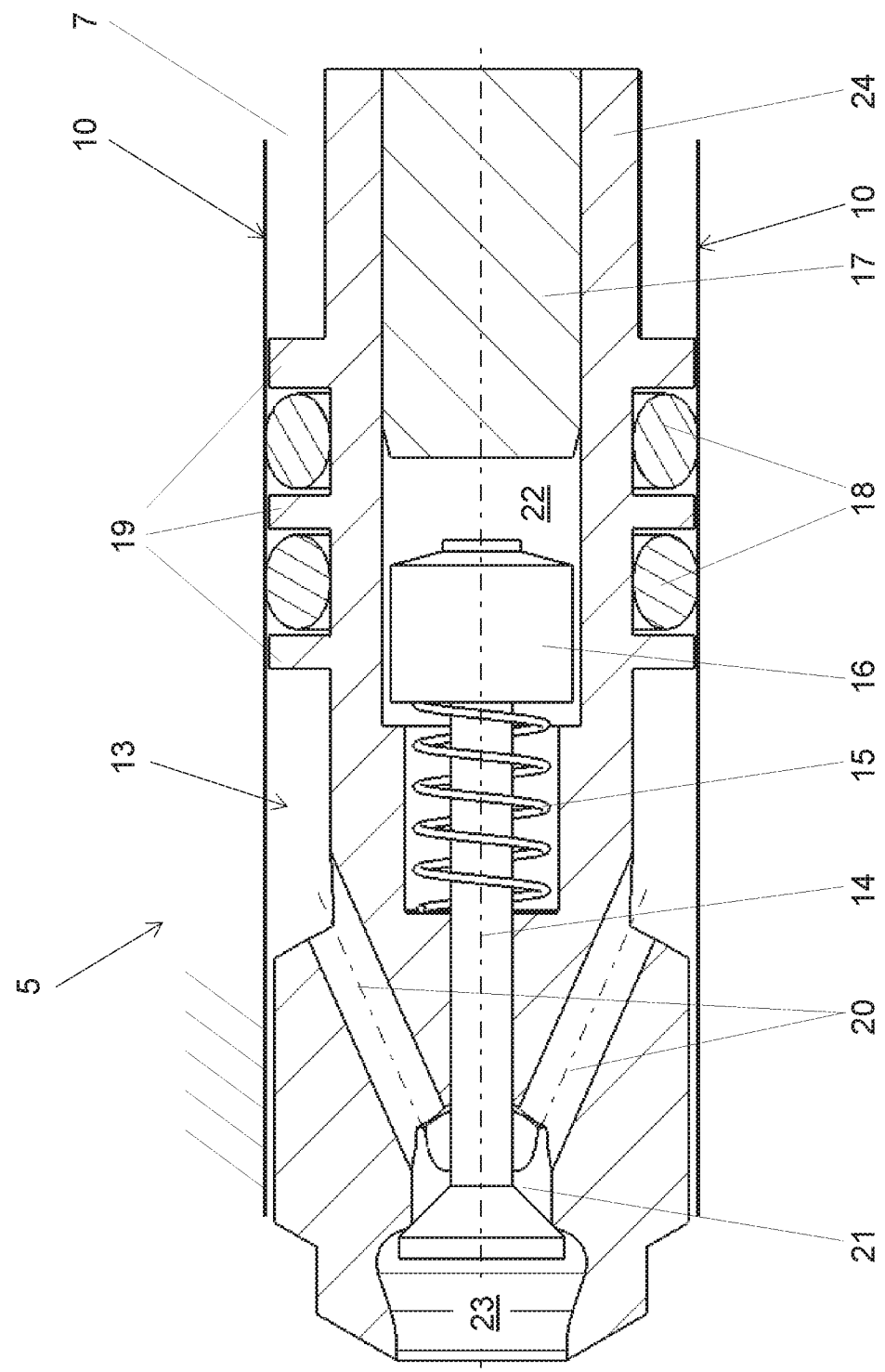

FIG. 5b shows a variant of FIG. 5a in which the space 23 is of a very substantially pear-shaped configuration narrowing towards the pre-chamber 3. That configuration is particularly advantageous from the fluidic point of view.

LIST OF REFERENCES USED 1 internal combustion engine
2 cylinder head
3 pre-chamber
4 spark plug sleeve
5 pre-chamber gas valve
6 spark plug
7 cavity
8 passage
9 flow transfer bore
10 wall of the cavity 7
11 spark plug bore
12 gas feed passage
13 annular passage
14 valve needle
15 valve spring
16 cap
17 plug
18 O-ring
19 projection
20 gas passage
21 lower cavity of the pre-chamber gas valve
22 upper cavity of the pre-chamber gas valve
23 space
24 valve body
S1 axis of symmetry
S2 axis of symmetry

The invention claimed is:

1. A cylinder head comprising:
a cavity for receiving a pre-chamber gas valve;
a recess extending substantially or completely around the pre-chamber gas valve forming an annular passage defined by a wall of the cavity and the recess of the pre-chamber gas valve;
at least one gas feed passage within the cylinder head, the at least one gas feed passage with a horizontal portion and a vertical portion with respect to a longitudinal axis of the pre-chamber gas valve, the horizontal portion connecting to the annular passage for supplying the pre-chamber gas valve with combustion gas; and
at least one inclined gas passage arranged to extend from the annular passage to a lower cavity of the pre-chamber gas valve, connecting via the at least one inclined gas passage the annular passage to the lower cavity of the pre-chamber gas valve.

2. The cylinder head as set forth in claim 1, wherein an angle of the at least one inclined gas passage with respect to the longitudinal axis of the pre-chamber gas valve is between 20° and 70°.

3. The cylinder head as set forth in claim 1, wherein a spark plug sleeve is arranged within the cylinder head, with the wall of the cavity defined by the spark plug sleeve.

4. The cylinder head as set forth in claim 1, wherein the wall of the cavity is defined by the cylinder head.

5. The cylinder head as set forth in claim 1, wherein between the pre-chamber gas valve and a pre-chamber or between the pre-chamber gas valve and a passage leading to a pre-chamber, is a space.

6. The cylinder head as set forth in claim 5, wherein the space is of a substantially pear-shaped configuration which narrows towards the pre-chamber.

7. The cylinder head as set forth in claim 1, wherein the pre-chamber gas valve has at least one projection with one side of the at least one projection abutting and delimiting the annular passage, and an opposite side of the at least one projection abutting a sealing means for creating a seal between the pre-chamber gas valve and the wall.

8. The cylinder head as set forth in claim 1, wherein a spark plug is arranged in the cylinder head, wherein the spark plug and the pre-chamber gas valve are arranged in a common cavity of the cylinder head.

9. The cylinder head as set forth in claim 7, wherein the spark plug and the pre-chamber gas valve are arranged in separate bores.

* * * * *